(12) United States Patent
Haid

(10) Patent No.: US 10,789,865 B2
(45) Date of Patent: Sep. 29, 2020

(54) DISPLAY ELEMENT WITH TRANSITION LAMINATION OF PARTIAL FILMS AND COATINGS

(71) Applicant: Bayerische Motoren Werke Aktiengesellschaft, Munich (DE)

(72) Inventor: Jochen Haid, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 66 days.

(21) Appl. No.: 16/280,215

(22) Filed: Feb. 20, 2019

(65) Prior Publication Data

US 2019/0180655 A1 Jun. 13, 2019

Related U.S. Application Data

(63) Continuation of application No. PCT/EP2017/073966, filed on Sep. 22, 2017.

(30) Foreign Application Priority Data

Oct. 5, 2016 (DE) .......................... 10 2016 219 288

(51) Int. Cl.
*G09F 13/06* (2006.01)
*G09F 13/08* (2006.01)
(Continued)

(52) U.S. Cl.
CPC .............. *G09F 13/06* (2013.01); *B32B 3/266* (2013.01); *B32B 27/00* (2013.01); *B32B 27/06* (2013.01);
(Continued)

(58) Field of Classification Search
CPC .......... G09F 13/06; G09F 21/04; G09F 13/08; G09F 2013/044; B32B 27/00;
(Continued)

(56) References Cited

U.S. PATENT DOCUMENTS 2,372,124 A * 3/1945 Schenkel ................ G09F 13/26
40/577
2,592,262 A * 4/1952 Fox ......................... G03B 21/64
40/701
(Continued)

FOREIGN PATENT DOCUMENTS

DE 198 20 283 A1 11/1999
DE 103 32 550 B4 3/2004
(Continued)

OTHER PUBLICATIONS

International Search Report (PCT/ISA/210) issued in PCT Application No. PCT/EP2017/073966 dated Nov. 23, 2017 with English translation (six (6) pages).
(Continued)

*Primary Examiner* — Cassandra Davis
(74) *Attorney, Agent, or Firm* — Crowell & Moring LLP

(57) ABSTRACT

A display element having a display symbol arrangement, includes a carrier layer on a visible side, at least one display layer arranged on the side facing away from the visible side and one cover layer arranged on the carrier layer and the display layer. The transitions between the display layer and the cover layer are laminated in such a manner that the different layers form a common surface having the same optical effect and without hard edges at their transitions.

11 Claims, 3 Drawing Sheets

(51) Int. Cl.
*B60Q 3/14* (2017.01)
*B32B 27/00* (2006.01)
*G09F 21/04* (2006.01)
*B32B 3/26* (2006.01)
*B32B 27/06* (2006.01)
*G09F 13/04* (2006.01)

(52) U.S. Cl.
CPC .............. *B60Q 3/14* (2017.02); *G09F 13/08* (2013.01); *G09F 21/04* (2013.01); *B32B 2255/10* (2013.01); *B32B 2457/20* (2013.01); *B32B 2590/00* (2013.01); *G09F 2013/044* (2013.01)

(58) Field of Classification Search
CPC ..... B32B 3/266; B32B 27/06; B32B 2255/10; B32B 2457/20; B32B 2590/00; B32B 2307/412; B32B 2307/402; B60Q 3/14; Y10T 428/10; Y10T 428/1041; Y10T 428/23; Y10T 428/24331
USPC ....... 428/13, 14, 38, 29, 195.1; 40/579, 580, 40/577
See application file for complete search history.

(56) References Cited

U.S. PATENT DOCUMENTS

| | | | | |
|---|---|---|---|---|
| 4,138,284 A | * | 2/1979 | Postupack | B05B 12/18 156/100 |
| 5,444,932 A | * | 8/1995 | Jeroma | G09F 13/08 40/564 |
| 5,453,339 A | | 9/1995 | Frost et al. | |
| 6,495,261 B1 | * | 12/2002 | Gagliardi | B32B 17/10018 296/190.1 |
| 2006/0210772 A1 | * | 9/2006 | Bui | B32B 3/263 428/157 |
| 2013/0101799 A1 | | 4/2013 | Trier | |
| 2013/0280463 A1 | * | 10/2013 | On | B32B 3/10 428/38 |
| 2019/0331959 A1 | * | 10/2019 | Weindorf | G06F 3/044 |

FOREIGN PATENT DOCUMENTS

| | | |
|---|---|---|
| DE | 10 2009 032 815 A1 | 1/2011 |
| DE | 10 2010 030 911 A1 | 1/2012 |
| DE | 10 2010 034 714 A1 | 2/2012 |
| DE | 10 2011 001 101 A1 | 9/2012 |
| EP | 2 208 645 A1 | 7/2010 |
| GB | 2 243 013 A | 10/1991 |
| JP | 2000-89698 A | 3/2000 |

OTHER PUBLICATIONS

German-language Written Opinion (PCT/ISA/237) issued in PCT Application No. PCT/EP2017/073966 dated Nov. 23, 2017 (six (6) pages).

German Search Report issued in counterpart German Application No. 10 2016 219 288.4 dated Aug. 2, 2017 with partial English translation (13 pages).

* cited by examiner

DISPLAY ELEMENT WITH TRANSITION LAMINATION OF PARTIAL FILMS AND COATINGS

CROSS REFERENCE TO RELATED APPLICATIONS

This application is a continuation of PCT International Application No. PCT/EP2017/073966, filed Sep. 22, 2017, which claims priority under 35 U.S.C. § 119 from German Patent Application No. 10 2016 219 288.4, filed Oct. 5, 2016, the entire disclosures of which are herein expressly incorporated by reference.

BACKGROUND AND SUMMARY OF THE INVENTION

The invention relates to a display element having a display symbol arrangement.

This type of display element is commonly used, inter alia, in the automotive sector. For example, it is used for control elements such as gear selector levers or buttons in the field of infotainment systems and warning systems or in pure information displays in the field of infotainment systems, warning systems, or air-conditioning systems. Information should be presented such that it is clearly visible to vehicle passengers or to the respective observers in various light conditions. This information presentation should be effected in a visually appealing fashion and yet be simple and inexpensive to produce.

For this purpose, a plurality of layers of paint or film having different properties are applied to a carrier layer. In order to impart an optically uniform appearance to the resulting surfaces, the layers are matched to each other exactly in terms of color and appearance. However, color and appearance of a surface are highly dependent on individual production batches or suppliers. For this reason, it is desired to find a way to conceal the hard transition between different layers or appearances and to make it appear smooth in this way.

Various embodiments for transition concealment between layers are already known from the prior art. The teaching of DE 103 32 550 B4 discloses, on the basis of a laminated windshield, a layer that adapts to the carrier layer thereof by way of a changing light transmissivity and transitions into the optical appearance of the carrier layer. However, the result is typically neither an optically uniform appearance nor an information display under changing light conditions.

Both DE 10 2010 034 714 A1 and DE 10 2010 030 911 A1 respectively disclose methods for producing components with different surface layers and the transition thereof. However, both methods typically give rise to clearly visible transition regions, in which the surface layers are sharply delineated from one another along an edge. Usually, neither an information display is made possible here nor is a uniform appearance offered.

DE 10 2009 032 815 A1 discloses an information display behind a lacquer film surface, whereby an optically consistent image is created. However, only one film must typically be used on the entire surface because otherwise undesired inconsistencies and surface transitions would form. The film must follow the entire shape of the component, without deforming in the region of the information reproduction. In many cases, this means increased outlay in the design and manufacture of such products and entails additional expenses in both areas.

DE 10 2011 001 101 A1 discloses an illuminated button of a membrane keypad. However, only one layer is used for the information display in the form of fixed symbols, because the region to be covered is small.

The invention is therefore based on the object of overcoming the disadvantages of the prior art and of providing a cost-effective, simple solution for the visually appealing presentation of information by way of a display symbol arrangement on a surface with a partially complex shape.

This and other objects are achieved by a display system in accordance with embodiments of the invention.

A display element is provided with a display symbol arrangement. The display element comprises a carrier layer on a first side, at least one display layer arranged on the side that is opposite the first side, and a cover layer arranged on the carrier layer and the display layer. The cover layer forms at least one cutout having a surrounding cutout periphery defining the at least one cutout, and the display layer has a surrounding outer periphery. The at least one cutout in the cover layer is covered by the display layer. The display layer and the cover layer have a transition region between the surrounding cutout periphery and the surrounding outer periphery of the display layer. The display layer forms a periphery region from an inner periphery, located on the display layer in a manner congruent with the surrounding cutout periphery, to the surrounding outer periphery. This means that the inner periphery and the cutout periphery are congruent for an observer viewing the display element from the viewing side. A color density of the display layer decreases in the periphery region from the inner periphery to the outer periphery, with the result that an optical appearance of the display layer transitions smoothly into an optical appearance of the cover layer.

A cutout that is formed by the cover layer need not be covered by the display layer, but each display layer covers a cutout. The color density here refers to the number of pigments in a periphery region portion and/or the covering capacity of the pigments in a periphery region portion. The color density therefore determines the transparency in a periphery region portion. A periphery region portion on the display layer follows the shape of the inner periphery, and surrounds the inner periphery in the periphery region at a certain distance. The decrease in the color density in a periphery region portion is implementable using different methods. In one embodiment, the thickness of the layer decreases from the inner periphery to the outer periphery of the display layer, with the result that the transparency thereof increases. Each periphery region portion may include different patterns whose proportion of color pigments is lower in comparison to an adjacent periphery region portion situated more closely to the inner periphery.

The technical effect of the features described produces a soft and smooth transition between two layers that lie one above the other. The result for the viewer from the viewing side is a uniform image of the total area formed by the two layers. The total area appears as if it were made from one material or one layer and not assembled. The viewing side is the side of the layers which is intended for viewing the display element in the installed state.

One advantageous embodiment occurs when the display layer is arranged on the carrier layer, and the cover layer is arranged on the display layer. Alternatively, the cover layer is arranged on the carrier layer, and the display layer is arranged on the cover layer.

In a further advantageous embodiment, the carrier layer is a transparent plastic. A viewer or occupant always views the display element from the side of the carrier layer of the display element that is remote from the cover layer. The transparency of the carrier layer thus creates a depth effect that creates a classy and modern-looking surface appearance.

Further development variants are advantageous, in which the carrier layer determines a surface form of the display element. In this way, the display element can be incorporated into a design of the vehicle interior without affecting it negatively by a design-atypical form. Furthermore, the display element can be integrated directly into a control element such as switches, buttons or levers.

An advantageous embodiment provides that the display layer and the cover layer are each formed by a film or a color layer. The colors and/or the transparency of the films and/or colors of the display layer and cover layer are similar. In this way, an optically almost invisible transition between the layers can be created.

Of advantage is a development in which the color layer is applied directly on the carrier layer and/or the display layer and/or the cover layer by a printing and/or painting method. Pad printing may be used as the printing method, with which for example the display layer is applied onto the carrier layer.

Advantageous is a development in which a first pigment density or color density of a surrounding outer portion of the periphery region corresponding to the periphery region portion is lower than a second pigment density or color density of a surrounding inner portion of the periphery region or the periphery region portion that is located more closely to the inner periphery. Consequently, the transparency of the display layer uniformly increases toward the outer periphery. If the layers are situated one above the other, it has the appearance that the already similar color shades of the layers smoothly transition into one another.

An advantageous development provides that an illumination element is arranged at least on the side of the display layer that is remote from the carrier layer, with the result that the display layer is illuminable by the illumination element in the direction of the carrier layer. Alternatively, the illumination element is arranged on the side of the carrier layer that is remote from the cover layer. The display layer or the cover layer in this arrangement is illuminable through the transparent carrier layer. Due to the alternative arrangements, the symbols on the display layer are illuminated. In poor light conditions or in light conditions which are disadvantageous for the readability of the information represented by the display element, such as strong sunlight or darkness, the ability of the symbols of the display layer to be seen is limited and said symbols are illuminated by the illumination element. Furthermore, an illumination element can also serve as a function display. A symbol represents the state of a function, e.g., air conditioning. To display a specific state, e.g. "On", the symbol is illuminated. To distinguish between illumination for better visibility and a function display, a plurality of illumination elements of different colors are used. Alternatively or in addition, an illumination element for function display of an adjacent symbol can also be arranged directly behind a cutout, which is not covered by the display layer, in the cover layer. A system is represented for example by a symbol and a function display arranged next to the symbol. The symbol is illuminable for easier reading. The display of a state is effected via the function display that is arranged next to it.

Of advantage is an embodiment variant, in which the display layer forms at least one first symbol, which is visible from the viewing side. The first symbol may be formed by a printing method, heat treatment or laser and differ in terms of coloration from the coloration or color of the surrounding display layer.

An advantageous development variant provides that the cover layer forms, by way of a shape of the cutout, a second symbol that is visible from the viewing side. The second symbol can be formed by a printing method, heat treatment or laser and differ in terms of coloration from the coloration or color of the surrounding display layer.

Furthermore, according to a further advantageous development variant, the illumination element is arranged on the first side of the carrier layer, and the cover layer and the display layer are arranged on the side of the carrier layer that is opposite the first side of the carrier layer. The display layer and the cover layer are then illuminable through the transparent carrier layer by at least one illumination element.

The above-disclosed features can be combined as desired provided that this is technically possible and they are not in conflict with each other.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
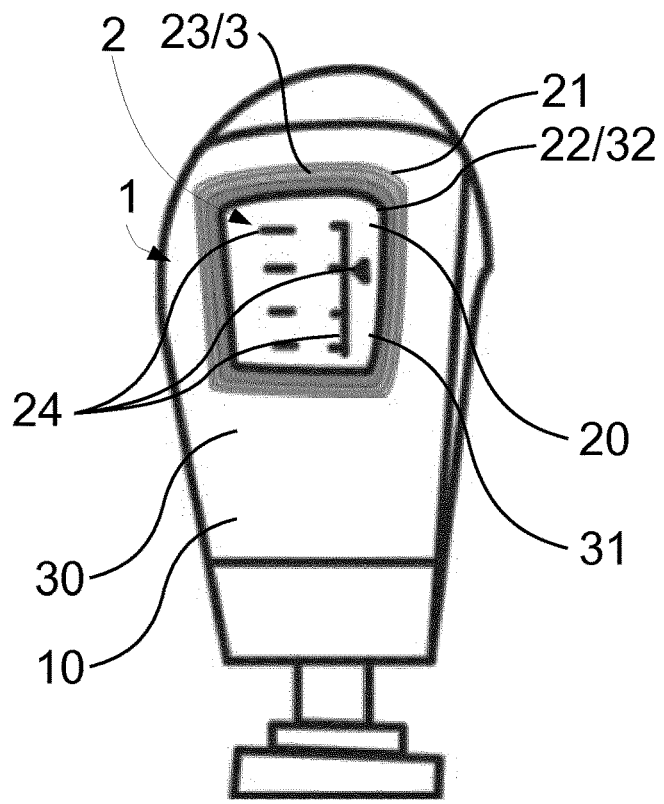
FIG. 1 shows a perspective view of a gear selector lever with a display element.

FIG. 1 shows a gear selector lever in which part of the surface is defined by a display element 1. For displaying the operating state of the vehicle (drive, neutral, reverse, etc.), a corresponding display symbol arrangement 2 having a plurality of first symbols 24 is formed by the display layer 20. The display layer 20 is directly applied on the side of the carrier layer 10 that is remote from the viewing side. Furthermore, the cover layer 30 is applied onto the remaining region of the carrier layer 10 and at least partially onto the display layer 20, with the result that the cutout 31 is situated over the display layer 20. The surrounding cutout periphery 32 of the cover layer defines, by way of its position on the display layer, the inner periphery 22. The periphery region, in which the color density of the display layer decreases incrementally, here extends from the inner periphery 22 of the display layer to the outer periphery 21 of the display layer. The transition region 3 is determined by the periphery region 23 of the display layer that is located on the cover layer 30. By way of the periphery region 23, the coloration of the display layer 20 transitions in the transition region 3 into the coloration of the cover layer 30. Since the transition between similar colorations of the cover layer and the display layer is incremental, no edge between the layers can be seen. The optical transition is blurred, and thus an optically uniform surface is created.

Figure 2:
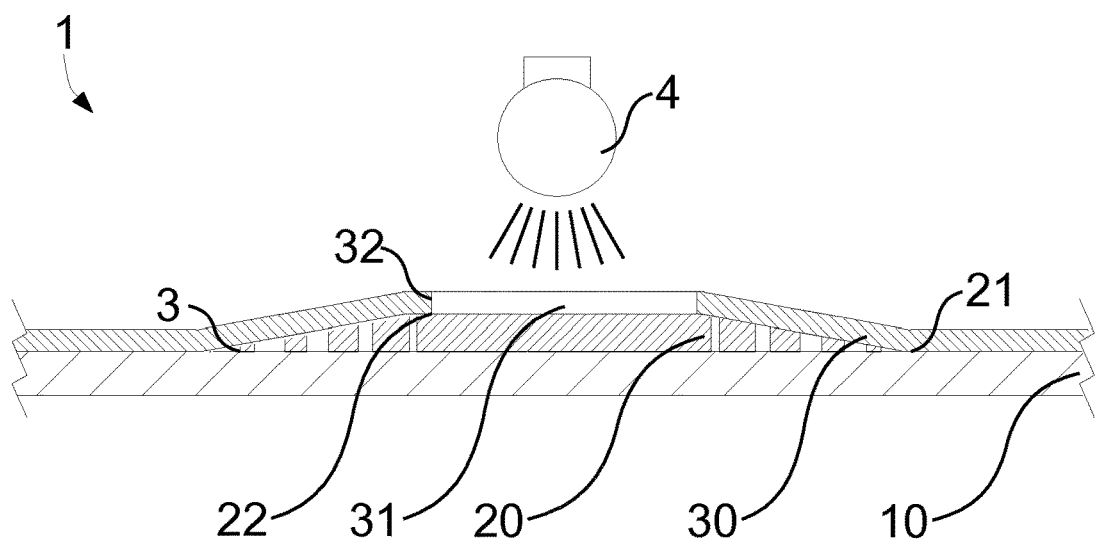
FIG. 2 is a sectional view through a display element.

FIG. 2 shows a sectional view of the display element from FIG. 1. The display layer 20 is arranged between the transparent carrier layer 10 and the cover layer 30. Additionally illustrated schematically is an illumination element 4 which irradiates the cutout 31 from the side that is remote from the viewing side. The periphery region of the display layer 20 decreases from the inner periphery 22, which is congruent with the surrounding cutout periphery 32, toward the outer periphery 21. Consequently, the transparency increases toward the outer periphery, and the cover layer 30 that is situated behind it is more easily visible. Alternatively, the illumination element 4 is able to be arranged on the carrier-layer side, as a result of which the display layer is illuminable through the transparent carrier layer and the viewing side is on the cover-layer side.

Figure 3:
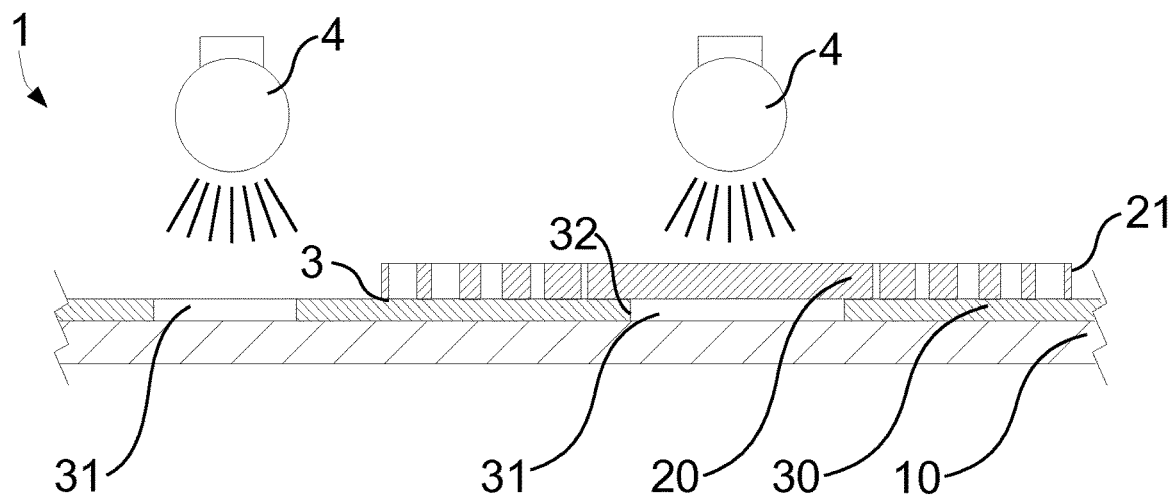
FIG. 3 is a sectional view through a further display element.

FIG. 3 shows a display element, in which the cover layer 30 having a plurality of cutouts 31 is arranged directly on the carrier layer 10. Situated behind some of the cutouts 31 is the display layer 20 on the side of the cover layer 30 that is remote from the viewing side. To prevent edges of the cutouts 31 from being visible from the viewing side of the carrier layer 10 against the backlighting of the illumination by way of the illumination elements 4, the periphery region of the display layer 20 is embodied such that a transition between the colors occurs in the transition region 3 between the cutout periphery 32 and the outer periphery 21 of the display layer 20. The display layer is, for example, white, while the cover layer is black. The shape of the cutouts 31 determines the shape of a symbol, the color of the display layer determines its color. For easier reading in poor light conditions, the symbol is illuminable by the illumination element 4. A function display is effected via the cutout, directly behind which an illumination element 4 is arranged. Alternatively, the illumination elements 4 are arrangeable on the carrier-layer side, as a result of which the display layer and the cover layer are illuminable through the transparent carrier layer and the viewing side is situated on the cover-layer side.

Figure 4:
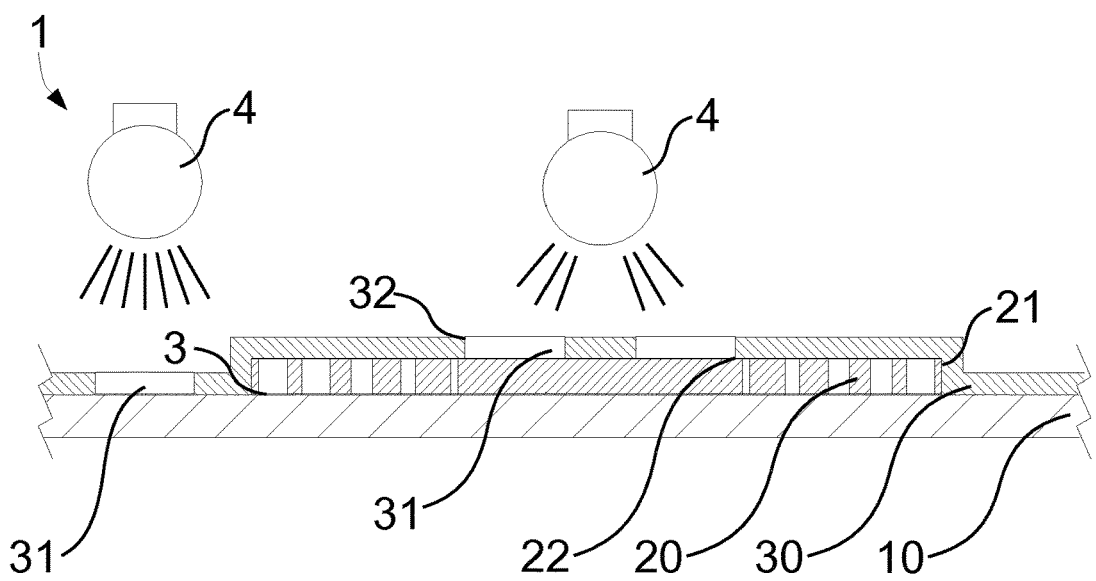
FIG. 4 is a sectional view through a further display element.

FIG. 4 shows a display element having a structure similar to FIG. 3, but the display layer 20 comprises two display regions. The shape of the cutouts 31 in the cover layer can determine the shape of the display symbol arrangement 2, which becomes visible by illumination. Alternatively, easily visible and readable information with sharply delineated edges is provided to the observer by way of an identical display symbol arrangement 2, which is incorporated in the display layer 20, and by way of the illumination of the symbol arrangement formed on the cover layer 30 and the display layer 20. The illumination, or the illumination of the cutout 31 which is not situated in the region of the display layer 20, alternatively serves for the function display. Alternatively, a different display symbol arrangement 2 is able to be introduced in the two regions, which are not covered, of the display layer 20. In this way, a plurality of pieces of information are displayed and illuminated by the illumination 4. Alternatively, the illumination elements 4 are arrangeable on the carrier-layer side, as a result of which the display layer and the cover layer are illuminable through the transparent carrier layer and the viewing side is situated on the cover-layer side.

Figure 5:
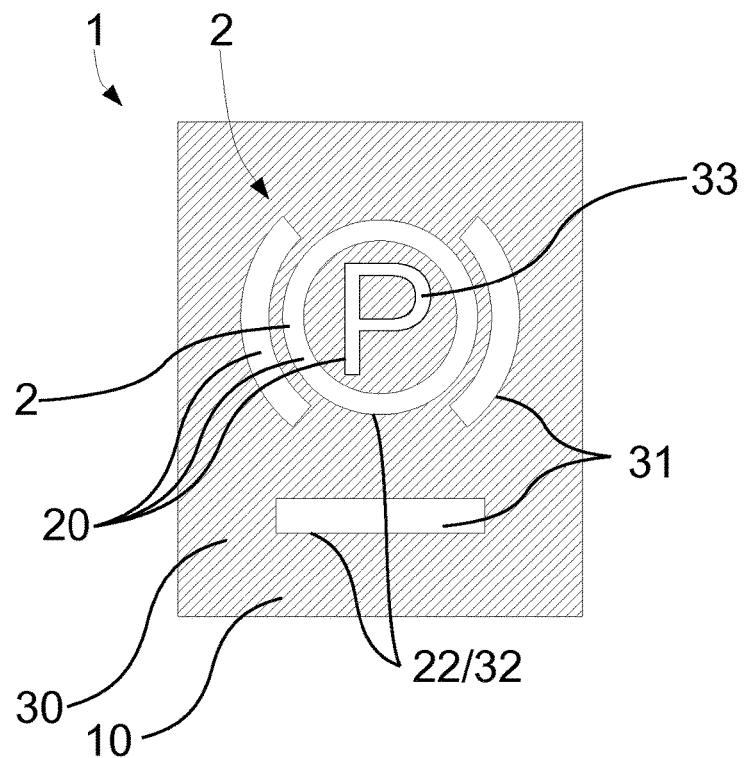
FIG. 5 is a plan view of a display element.

FIG. 5 shows a plan view of a display element 1 with a display symbol arrangement 2, wherein the cover layer 30 is visible behind the transparent carrier layer 10. A cutout 31 in the form of a symbol arrangement 33 has been introduced in the cover layer 30 using a laser method, which symbol arrangement 33 is covered by the display layer 20. Another cutout 31 serves for the function display.

Figures 6A, 6B, 6C:
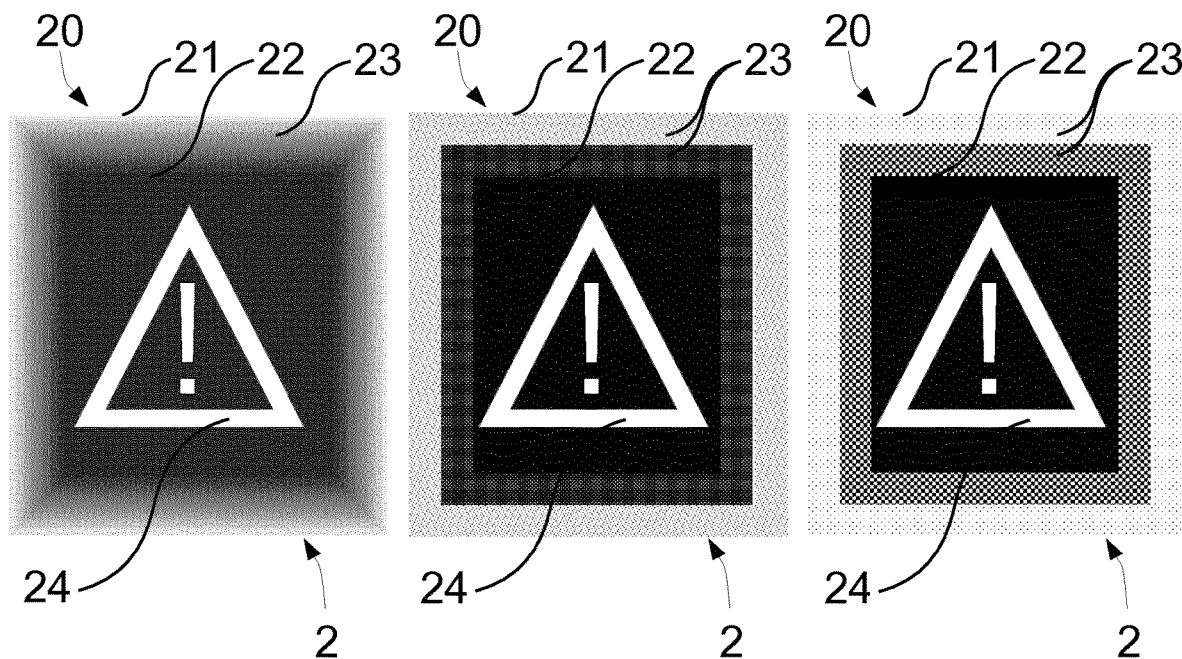
FIGS. 6A-6C show three representations of display layers having different embodiments with respect to the periphery region The figures are schematic by way of example. The same reference signs in the figures indicate the same functional and/or structural features.

FIGS. 6A to 6C each show a display layer 20 in which the periphery region 23, extending in each case from the inner periphery 22 to the outer periphery 21, has different embodiments. In FIG. 6A, the periphery region fades seemingly uniformly. For this purpose, the periphery region portions chosen are very small and the number of the color pigments is lower in each periphery region portion when compared to a directly adjacent periphery region portion that is situated more closely to the inner periphery. In FIGS. 6B and 6C, the periphery region portions are each embodied by different patterns. A pattern has, relative to its periphery region portion, a uniform distribution of the color pigments or color density. The pattern is denser in a periphery region portion that is situated more closely to the inner periphery and contains more color pigments than a periphery region portion which is situated more closely to the outer periphery. This creates an optical image of the color gradient, and the transition between the display layer 20 and the cover layer 30 in the transition region appears to be almost seamless.

The invention in terms of its implementation is not limited to the above-stated preferred exemplary embodiments. Rather, a number of variants are conceivable which make use of the presented solution even for fundamentally different embodiments. For example, a periphery region having portions of different color density and/or transparency is also possible in the cover layer.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A display element having a display symbol arrangement, comprising:
   a carrier layer on a first side;
   at least one display layer arranged on a side that is opposite the first side; and
   a cover layer arranged on the carrier layer and the display layer, wherein
   the cover layer forms at least one cutout having a surrounding cutout periphery defining the at least one cutout,
   the display layer forms a surrounding outer periphery,
   the at least one cutout in the cover layer is covered by the display layer,
   the display layer and the cover layer have a transition region between the surrounding cutout periphery and the surrounding outer periphery of the display layer,
   the display layer forms a periphery region which extends from the surrounding outer periphery to an inner periphery,
   the inner periphery is located on the display layer in a manner congruent with the surrounding cutout periphery, and
   a color density of the display layer decreases in the periphery region from the inner periphery to the outer periphery, whereby an optical appearance of the display layer transitions smoothly into an optical appearance of the cover layer.

2. The display element as claimed in claim 1, wherein the display layer is arranged on the carrier layer and the cover layer is arranged on the display layer, or the cover layer is arranged on the carrier layer and the display layer is arranged on the cover layer.

3. The display element as claimed in claim 1, wherein the carrier layer is a transparent plastic.

4. The display element as claimed in claim 1, wherein the carrier layer determines a surface form of the display element.

5. The display element as claimed in claim 1, wherein the display layer and the cover layer are each formed by a film or a color layer.

6. The display element as claimed in claim 5, wherein the color layer is applied directly onto one or more of the carrier layer, the display layer and the cover layer, via a printing and/or painting method.

7. The display element as claimed in claim 1, wherein a first pigment density of a surrounding outer portion of the periphery region is lower than a second pigment density of a surrounding inner portion of the periphery region that is located more closely to the inner periphery.

8. The display element as claimed in claim 1, further comprising:
   an illumination element arranged at least on the side of the display layer that is remote from the carrier layer, such that the display layer is illuminable by the illumination element in the direction of the carrier layer, or
   an illumination element arranged on the side of the carrier layer that is remote from the cover layer, such that the display layer is illuminable by the illumination element from the direction of the carrier layer.

9. The display element as claimed in claim 1, wherein the display layer forms at least one first symbol, which is visible from a viewing side.

10. The display element as claimed in claim 1, wherein the cover layer forms, by way of a shape of the cutout, a second symbol which is visible from a viewing side.

11. The display element as claimed in claim 1, wherein the cover layer forms, by way of a shape of the cutout, a second symbol which is visible from a viewing side.

\* \* \* \* \*